Nov. 1, 1949.  A. C. BROWN  2,486,630
FAT HYDROLYSIS PROCESS AND APPARATUS
Filed March 13, 1946  5 Sheets-Sheet 1

INVENTOR.
Alexander C. Brown
BY
Wood, Arey, Herrm & Evans
ATTORNEYS

Nov. 1, 1949.  A. C. BROWN  2,486,630
FAT HYDROLYSIS PROCESS AND APPARATUS

Filed March 13 1946  5 Sheets-Sheet 4

INVENTOR.
Alexander C. Brown
BY
Wood, Arey, Herron & Evans
ATTORNEYS

Nov. 1, 1949.  A. C. BROWN  2,486,630
FAT HYDROLYSIS PROCESS AND APPARATUS
Filed March 13, 1946  5 Sheets-Sheet 5

INVENTOR.
Alexander C. Brown
BY
Wood, Arey, Herron & Evans
ATTORNEYS

Patented Nov. 1, 1949

2,486,630

UNITED STATES PATENT OFFICE 2,486,630

FAT HYDROLYSIS PROCESS AND APPARATUS

Alexander C. Brown, Cincinnati, Ohio, assignor to Emery Industries, Inc., Cincinnati, Ohio, a corporation of Ohio Application March 13, 1946, Serial No. 654,136

19 Claims. (Cl. 260—415)

This invention relates to a method for hydrolyzing fats and oils of the type exemplified by garbage grease, tallow, palm oil, cocoanut oil and other animal and vegetable oils or mixtures of them. The process is adapted to be carried out utilizing water alone as a hydrolyzing agent, though known catalyzers may also be used, if desired.

The method and apparatus, broadly, are improvements in relation to the method and apparatus disclosed and claimed in Tilghman Patent No. 28,315 of 1860 in which the hydrolysis is accomplished by means of a countercurrent reaction of fat and water at elevated temperature and pressure. This application is a continuation-in-part of my copending application Serial No. 514,913, filed December 20, 1943, now abandoned.

The process of the present invention contemplates dropping dispersed water through a rising column of fat at a temperature of 180° centigrade or above, the upper temperature limit being that at which the fat or oil is adversely affected by heat or at which the two separate phases disappear. This temperature with many fats and oils is about 285° to 300° centigrade. The pressure must be such as to maintain the water in liquid condition at the temperature selected.

It has been proposed by Tilghman, and others, to heat the oil and the water to the desired temperatures and pressures before contacting them countercurrently.

It is the though of the present inventor to heat the water to a temperature within the splitting range and approaching the desired operating range by direct contact with the hot fatty acid resulting from the hydrolysis and, conversely, to heat the fat to a corresponding degree by means of the hot glycerine water resulting from the hydrolysis, all within a single splitting tower. Thus, if the fat and water be introduced in a ratio substantially corresponding to the specific heats of the two bodies, then comparatively little heat need be added after the apparatus is once brought up to the operating temperature.

More specifically, water has a specific heat of 1.0 and fat has a specific heat of substantially 0.6. Thus, if 10 parts of fat to 6 parts of water be fed into the apparatus, the heat of the water is sufficient to heat the cold fat to the desired temperature and vice versa. Otherwise expressed, after the apparatus is brought to operating temperature the heat held by the fat and water is used over and over again, the hot fatty acid giving up its heat to the incoming water at the top of the column, the hot glycerine water giving up its heat to the relatively cool fat in the bottom of the column. Since the ratio of materials being treated is the inverse of their specific heats, the heat which must be added need be only that required to offset radiation losses and imperfect heat transfer. This ratio is also suitable for carrying the chemical reaction substantially to completion and at the same time obtaining a relatively concentrated glycerine water.

By this method of operation both the glycerine water and the fat are obtained in comparatively cool condition which has the practical advantage that the glycerine water will contain less absorbed fat or fatty acids than if hot, and a relatively cool fatty acid will contain less moisture than if hot. In this way, substantially all of the water introduced into the appartus is recovered at the bottom of the tower instead of part of it being removed with the hot fatty acid at the top.

Inasmuch as it is necessary to heat both the oil and the water to the desired operating temperature and to cool each after treatment by one means or another, and since hydrolysis proceeds at temperatures below the maximum utilized, though less rapidly, it is the concept of the present invention to utilize the heating periods for a part of the splitting. This not only speeds up the process and makes it more efficient, but it also minimizes the amount of high temperature heating required. Thus, the water heating zone at the top of the column is utilized to complete the desired degree of split; and the fat heating zone at the bottom of the column is utilized to initiate the split, even though the temperatures maintained in these zones are below the temperatures considered desirable to produce the maximum rate of split.

I have found that mixtures of neutral fats with fatty acids or monoglycerides or diglycerides or any combinations of them renders the mixture more susceptible to high pressure splitting than neutral fat. Hence, the splitting incident to the heat transfer in the lower zone pre-conditions the material for its hydrolysis at maximum temperature; in other words, by my heat transfer I feed to the splitting zone a modified fat which is more easily split than the starting material.

An additional advantage of the method and apparatus of this invention is that not only splitting but also heat exchange is effected within the confines of a single tower. It is advantageous to effect heat recovery from hot effluent glycerine water and split fatty acids while the pressure is maintained because if the heat recovery is attempted at lower pressures than those of the splitting operation, much high temperature heat is lost in the flashing of vapor from the hot liquids. On the other hand, if heat exchange is effected in a vessel separate from the splitting tower without reduction of pressure numerous high pressure connections are necessary between vessels, which connections are avoided by this invention.

The tower or column of the present invention comprises three zones, (1), the upper heat exchange zone in which the trays are located and in which the relatively cool water is being heated by the relatively hot fatty acid to a temperature approximating the desired operating temperature; (2), the lower heat exchange zone in which the relatively hot glycerine water is used to heat the incoming relatively cold fat; and (3), a central zone in which the maximum operating temperature; for instance, 240° centigrate to 260° centigrade, is maintained by means of heat applied mainly at the ends of the splitting zone.

Since the overall concept of the invention involves percolation of the water through the fat, that is, a gravity fall of a dispersed phase of water through a rising continuous phase of fat with both phases at an elevated temperature such as 240° to 260° centigrade, the transferring of heat to the incoming cool water and cool fat, both within the splitting tower itself, presents a peculiar problem. The difficulty of the problem is suggested by the consideration that at the operating temperature, the specific gravity of the dispersed water which is to fall is less than that of the cold fat being introduced at the bottom of the tower or of the colder fatty acid at the top of the tower, both of which are to rise. Otherwise expressed, the specific gravity of the contents of the tower must decrease from both top and bottom toward the center of the tower and yet a counterflow must obtain at all elevations.

In the upper heat exchange zone, i. e., that portion of the tower between the top and the zone of maximum splitting temperature, there is a tendency for the fatty acid and water to commingle, swirl, and emulsify. The swirling, which tends to cause emulsification through commingling is due to the fact that the fatty acid leaving the tower is heavier than either the fatty acid or heated water below, for water 250° centigrade is lighter than fatty acid at temperatures below 100° to 175° centigrade.

Therefore, the fatty acid or the water or both, must be channelled in the upper heat exchange zone at least to the degree necessary to avoid emulsion producing or temperature equalizing convection currents. Various types of channelling effective for this purpose are disclosed in the drawings, but they all have this in common; namely, the general counterflow of the fatty acid and water in respect to each other is maintained despite minor swirling of either or both.

In the lower heat exchange zone, that is, the zone between the bottom of the column and the point at which heat is applied to the contents of the column, the fat which is introduced at the bottom is heavier than the glycerine water entering the zone at its top. In fact, the fat would have to be heated to 125° to 150° centigrade before it would be lighter than the glycerine water at 250° centigrade and such heating would be necessarily fatal to the concept of removing glycerine water at a lower temperature. The incoming fat will not rise through the falling glycerine water until the fat picks up heat from the glycerine water, and the tendency of the fat to rise and the water to fall is augmented by the exchange of heat between them.

I have discovered that this phenomenon so operates that it is unnecessary to channel the fat and the glycerine water at the bottom since it is unnecessary to superimpose the heavier over the lighter as is requisite in the upper heat exchange zone. Heat exchange in the lower zone may be accomplished either by percolating the water from the splitting zone into the lower heat exchange zone or else by introducing the cool fat as a dispersed phase below the interface of the glycerine water pool at the bottom of the tower, and the desired heat exchange may be effected merely by the passage of droplets of one material through a continuous phase of the other. I have also determined that the heat exchange which is effected by commingling a dispersed phase of one material in a continuous phase of another material, is so efficient in the lower heat exchange zone that it need occupy but a small portion of the bottom portion of the tower.

The rate of passage of a particle of one liquid through the other is directly determined by their difference in gravity and these differences are in turn determined by the degree to which heat has been transferred so that the overall heat exchange is automatic. For example, if a droplet of water is falling through an ascending column of fat and should tend to fall so quickly for a short distance that it did not have time to transfer its heat to the fat, it would be approaching a condition of becoming lighter than the fat so that its rate of fall would decrease, permitting it to lose heat and become heavier and thus continue its descent.

Obviously, both the upper and the lower heat exchange zones may be of any desired length. If, for instance, high temperature heat is applied to the very middle of the column, then the temperature will fall toward each end, and although splitting will be progressing in each heat exchange zone, that is, both above and below the middle of the column, still the optimum splitting temperature will obtain, but for a small per cent of the total height of the column. The greatest efficiency, in the sense of through-put in relation to the height of the column, is obtained by utilizing the optimum splitting temperature throughout the greatest possible portion of the tower and, hence, reducing the linear dimensions of the heat exchange zones to the greatest degree possible.

In the preferred utilization of the invention neither heat exchange zone substantially exceeds 10 percent of the total height of the column, and each heat exchange zone should approximate 5 to 10 per cent of the total height of the column. I have discovered that the height of the lower heat exchange zone may be relatively constant for any given reduction in temperature of the glycerine water, regardless of through-put of fat and glycerine water, of course, within the limits operative for maintaining counterflow.

The exact length of the zones is a matter of engineering choice based upon the relationship of cost of equipment and operating saving. Inasmuch as most of the water must be later evaporated from the outgoing glycerine water, there is little point in reducing its temperature below that at which the evaporation is conducted, for instance, the boiling point of water. Likewise, the fatty acid removed from the tower is usually distilled or otherwise treated and, hence, it is seldom advantageous to attempt to cool it beyond a point which is appropriate in relation to the succeeding handling. Generally speaking, it is recommended that the fatty acid be cooled to a temperature of under 150° centigrade and preferably to the neighborhood of 100° centigrade, the exact degree of cooling depending partly on the temperature at which suitable feed water is available and partly on the other factors discussed.

As indicated, heat must be applied to the central splitting zone, not only to make up for radiation losses, but also to compensate for the selected and predetermined limitations of the heat exchange zones. Obviously, the heat exchange cannot be 100 per cent efficient without the use of a column of infinite length and, as indicated, the point at which the heat exchange is discontinued is a matter of engineering selection, though the general column proportioning discussed is recommended as a compromise suitable for a wide range of practical operating conditions.

Tower height is conserved by making the transitions between the central splitting zone and the end heat exchange zones as sharp as possible. In other words, after the heat exchange function is fulfilled to the selected degree both at top and bottom, then the temperature of the fat and water should be elevated to the optimum for splitting as quickly as possible. The central portion of the column may be steam-jacketed or equipped with electric heaters or temperature elevating elements may be introduced into the column, but these expedients which depend upon the heated surface area exposed do not provide a sudden temperature rise. Moreover, there is a limit on the temperature at which the additional heat may be introduced inasmuch as it is undesirable to have a temperature at any point in the column at which the fatty material and water may form a single phase. In general, it is not good practice to go above the temperature of 285° centigrade for most fatty materials.

In the preferred method and apparatus of this invention, the temperature of the water descending from the upper heat exchange zone and of the fat and fatty acid rising from the lower heat exchange zone are abruptly heated by the introduction of open, high temperature steam into the column; the quantity is limited, so that it chills and condenses after contact with the cooler contents of the column and, thus, discharges its own latent heat of condensation in the immediate zone of introduction. Thus, a given quantity of steam introduced into the column is far more immediately effective in elevating the temperature of the contents of the column than would be the same amount of steam in a closed coil within the column or in a jacket about the column. By the utilization of this concept, the functional demarkation of each zone is accentuated, the efficiency of the splitting zone approximates optimum and the overall requisite height of the tower is reduced to a minimum.

By accomplishing both splitting and heat exchange within the confines of a single high pressure splitting tower, the use of intricate and expensive external pre-heaters or heat exchangers, or both, is avoided and the high temperature heat, which is the expensive heat, requisite to accomplish the split and replace radiation losses is, for the most part, used over and over again. In short, increasing the overall height of the tower by an amount which does not exceed 25 per cent of the height which would otherwise be necessary, entirely obviates the necessity of external equipment, and effects a thermal efficiency which cannot be obtained by the use of external equipment. Thus, this invention accomplishes substantial economies, both from the point of view of original investment and operation.

With the above and other features and objects in view, the invention will now be described with reference to the accompanying drawings which illustrate a preferred embodiment of the invention and will be pointed out more specifically in the claims.

Figure 2 is a detailed sectional view of another tower constructed in accordance with this invention. Figure 2 illustrates the preferred construction.

Figure 1:
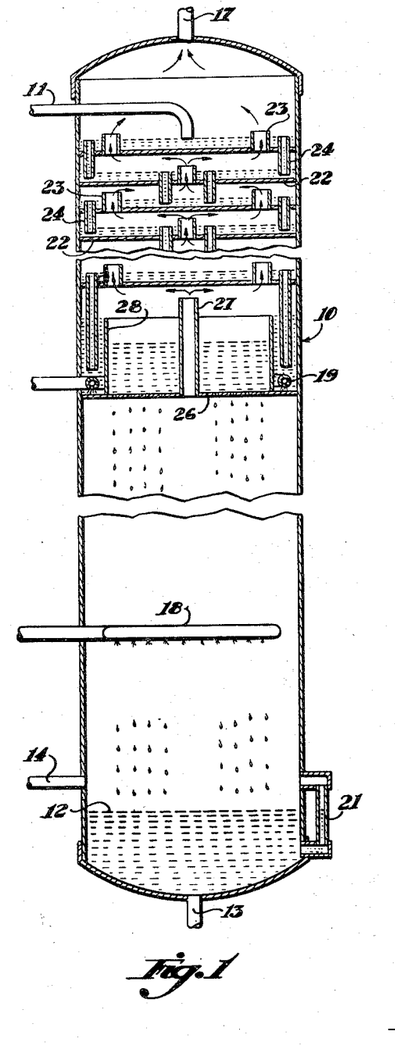
Figure 1 is a detailed sectional view of a high pressure splitting tower constructed in accordance with this invention.

With reference to Figure 1, a tower fabricated of stainless steel or other suitable material resistant to the corrosion of fatty acids and capable of withstanding the desired temperatures and pressures is indicated by 16. Water is fed into the top of the tower 10 through a line 11. The glycerine water indicated at 12 is removed from the bottom of the tower by means of a line 13. Fat or oil is introduced into the bottom of the tower through a line 14 and split fatty acid is removed from the top of the tower through a line 17.

Near the bottom of the tower 10 and above the level of the glycerine water 12 is located a direct steam coil 18 which is adapted to maintain the desired temperature in the center of the tower. A similar steam coil 19 is disposed in the upper part of the tower. Means for supplying heat to bring the temperature of the center section of the tower to the desired maximum other than direct steam coils, for instance, outside jackets or closed heat coils or electrical heating devices may also be utilized when desired, either in place of or in addition to the steam coils disclosed.

A sight glass 21 is preferably maintained near the bottom of the column at about the level of the glycerine water 12 in order to determine the exact level of the glycerine water and in order to control it, for instance, by regulating the glycerine water output.

A series of trays or baffles 22 is located in the upper part of the tower to improve the efficiency of the exchange of heat between the fatty acid and the incoming cool water and prevent convection currents in the upper heat exchange zone. While the use of these trays or baffles is not essential, still such use is recommended. Inasmuch as the fatty acid in the upper heat exchange zone is being cooled upwardly, a condition is found to obtain in which the cooler fatty acid is of greater density than the hotter fatty acid below it. This condition except for the baffles or other means for directing the flow of cool water and relatively hot fatty acid, would result in swirls or large convection currents which would bring the contents of the upper part of the tower, fatty acid and water alike, to a substantial equilibrium in temperature. The heat exchange thus obtained would be less than that possible and desired.

On this account I prefer to use a series of trays or baffles 22 over which the incoming water is flowed. Each tray is provided with a tubular conduit 23 through which the fatty acid may flow upwardly and a tubular overflow spout 24, the upper end of which is disposed above the tray to determine the depth of the water upon the trays. The lower end of each spout extends downwardly to the proximity of the next lower tray; thus, the fatty acid, partially or wholly split, flows upwardly through the conduits 23 and the water flows downwardly from tray to tray through the overflow spouts 24.

Mounted below the lowermost tray is a perforated distribution plate 26 through which the water flows into the central splitting section of the tower. Through the center of the perforated plate a tube 27 passes through, which the fatty acid or fat and fatty acid flow upwardly to the trays. As illustrated in Figure 1, an annular cup 28 is located above the perforated plate, and the direct steam coil 19 is disposed in the annular cup 28. The overflow spouts on the plate immediately above the perforated plate introduce water into the space between the perforated plate and the plate above, which water is heated by the steam coil before passing through the perforated plate 26 to percolate through the central splitting section of the tower; and the use of the annular cup 28 insures that the open steam coil 19 is always covered with water notwithstanding the extent to which the water above the perforated plate may vary in depth according to the specific conditions of operation in use at any given time.

Figure 2:
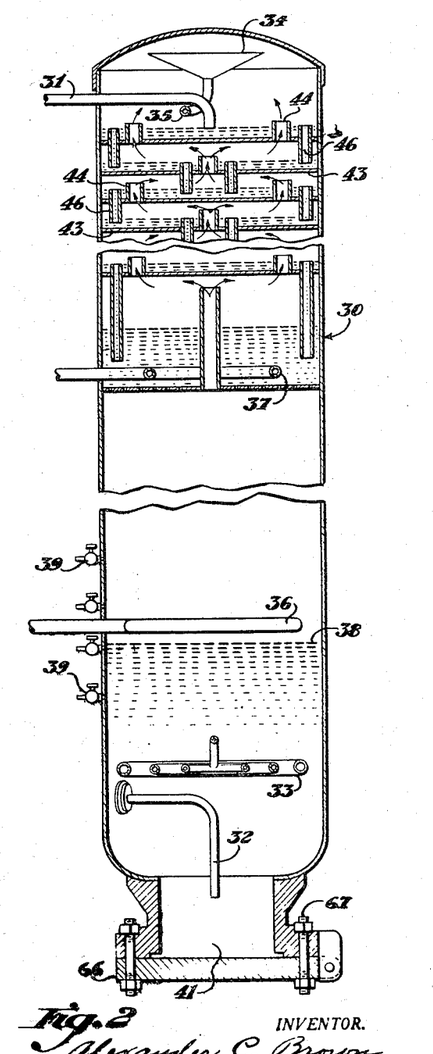

The apparatus illustrated in Figure 1 represents an early conception of the invention. Figure 2 shows the preferred embodiment. In Figure 2 a splitting tower is numbered 30. Water is introduced into the top of the tower through a line 31, and glycerine water is removed from the bottom of the tower through a line 32. The fat is introduced into the column through a series of coils 33, and split fatty acids are removed from the top of the tower by means of a funnel 34 and a line 35 attached to the lower end of the funnel and leading down from it.

Steam is introduced into the tower 30 at two points spaced from the ends. Steam is introduced through a steam coil 36 which is spaced from the bottom of the column and through a second steam coil 37 which is spaced from the top of the tower.

In the preferred embodiment of the invention it has not been found necessary to employ an annular water holding cup around the upper steam coil, as shown in Figure 1, in connection with the earlier device. In the continuous operation of the apparatus, a level of water is constantly and automatically maintained above the perforated plate by providing a suitable number and size of perforations on the perforated plate to maintain a level of water above the coil.

In the preferred operation as illustrated in Figure 2, the upper level of the glycerine water is kept at a height shown at 38, which may be either immediately below or immediately above the lower steam coil 36. A series of petcocks 39 is located along the side of the column at and near the level of the glycerine water to permit samples of the tower contents to be taken and to permit the removal of dirt and foreign matter which tends to collect at the upper surface of the glycerine water in the fat layer. Other dirt and foreign matter in the tower 30 collects at the bottom of the tower and is caught in a cup 41 located below the glycerine removal line 32.

Figures 5, 6, 7, 8:
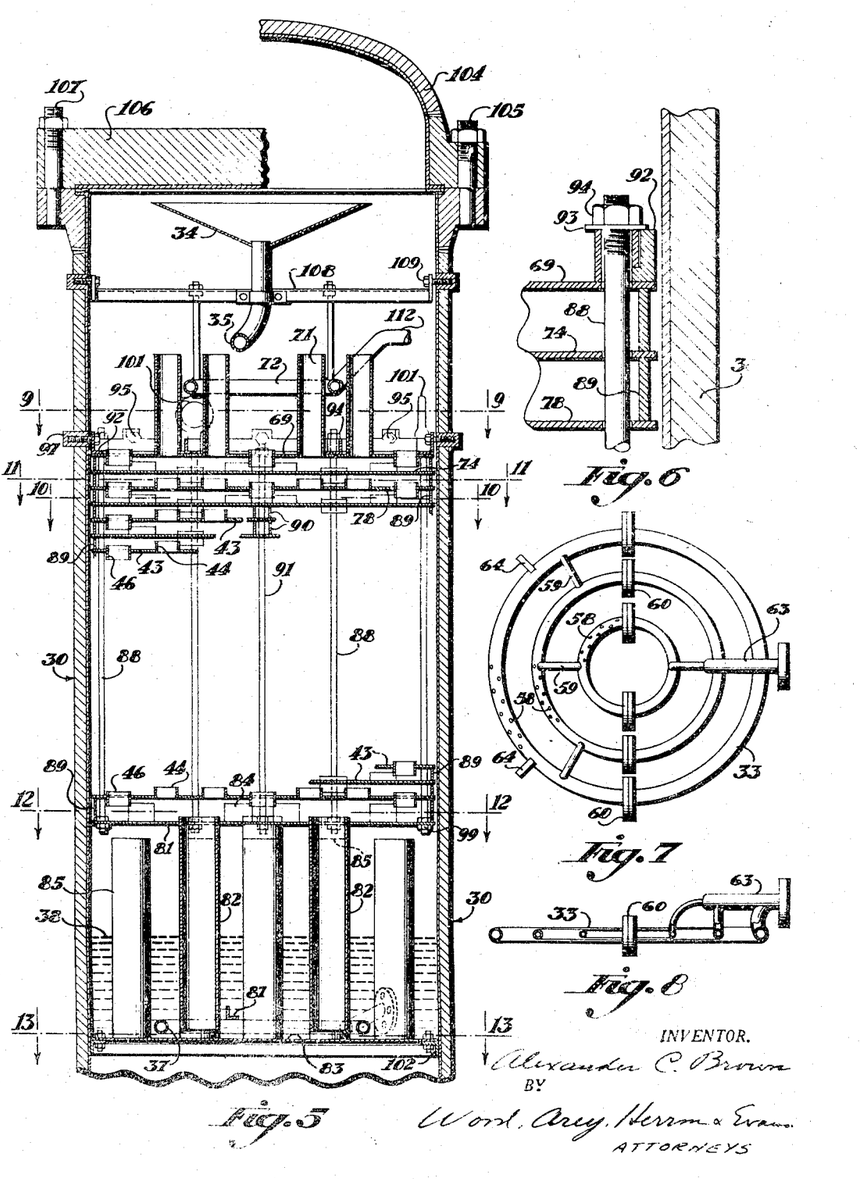
Figure 5 is a detailed sectional view showing the upper part of the tower illustrated in Figure 2.
Figure 6 is an enlarged detailed sectional view showing a support for the baffles located in the upper part of the tower shown in Figure 2.
Figure 7 is a plan view of the coils used to introduce fat into the lower part of the tower as shown in Figure 2.
Figure 8 is a sectional view of the coils illustrated in Figure 7 taken along the center line in Figure 7, the manifold used to introduce fat into the coils being shown in elevation.

The upper portion of the tower 30 contains a series of baffles 43. In Figure 2 the baffles are shown schematically for purposes of illustration. The more exact construction and design of the baffles 43 is shown in Figure 5, and they will be described in greater detail below. Each of the baffles 43 contains at least one tubular conduit or chimney 44 through which fatty acid may flow upwardly and at least one tubular downspout 46 through which water overflows down the tower.

Figures 3, 4:
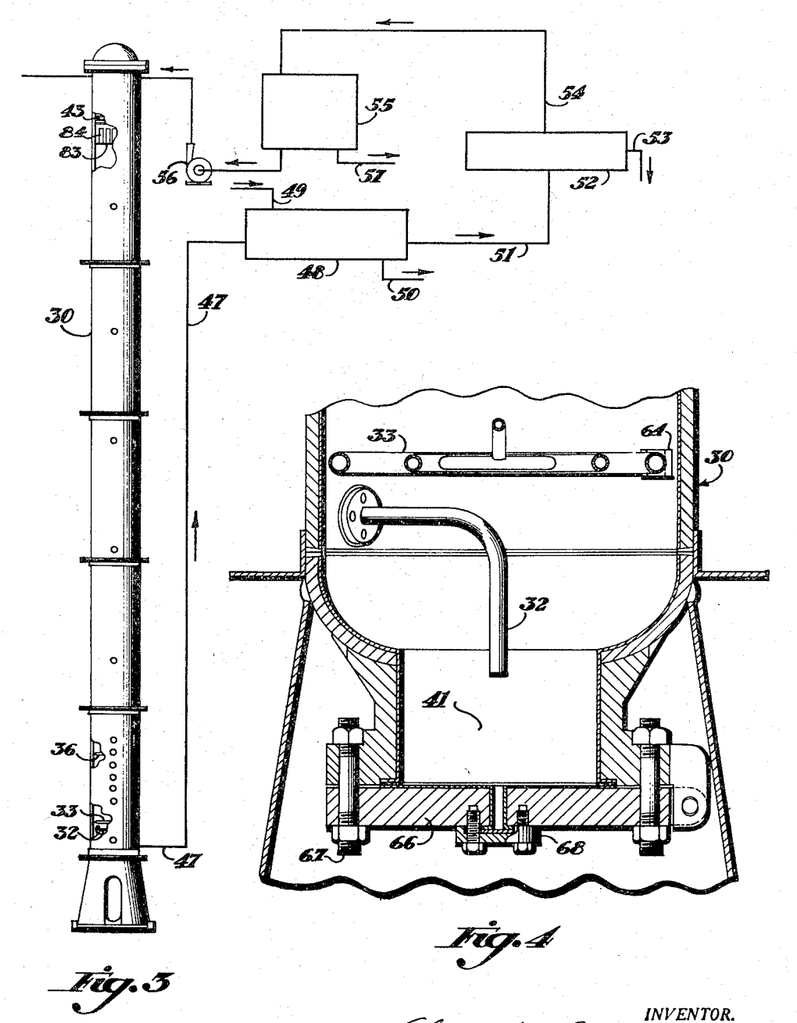
Figure 3 is a diagrammatic side elevational view of the tower illustrated in Figure 2, the apparatus used for recovery and recycling water being shown schematically.
Figure 4 is a detailed sectional view showing the construction of the lower part of the tower illustrated in Figure 2.

In Figure 3 the entire splitting operation is shown schematically. As shown in Figure 3, the column is quite tall and the heat exchange zones take up only a relatively short length of the column at top and bottom. The rest of the column between the heat exchange zones is open, and water percolates downwardly in a dispersed phase as droplets through a rising continuous-phase column of fat. Glycerine water is removed from the bottom of the tower through a line 32 and led to a treating pit 48 where the glycerine water may be treated with lime or alum or other material to coagulate impurities. Treating chemicals are introduced into the treating pit as at 49 and precipitated material is removed from the glycerine water as at 50 in a conventional manner. From the treating pit the glycerine water is led through a line 51 to an evaporator 52, not shown in detail, from which water is distilled and in which glycerine is recovered conventionally, as at 53. The distilled water from the evaporator is led through a line 54 to a water feed tank 55 from which it is pumped by means of a pump 56 into the top of the high pressure splitting tower 30. A small amount of the water must be removed from the water feed tank 55, as at 57, and discarded because more than sufficient water is recovered in the evaporation of glycerine water than is needed to serve as feed water in the pressure splitting.

Details of the lower portion of the column are shown in Figure 4 and in Figures 7 and 8. As already pointed out, fat is introduced into the column through a series of coils 33 (Figure 2). The coils 33, for the introduction of fat, as shown in Figure 7, consist of three rings of varying diameters all having the same center. Each of these rings contains a number of perforations 58 through which fat is introduced directly into the glycerine water contained in the lower portion of the tower 30 (Figure 2). As shown most clearly in Figure 7, the rings are joined together by connecting rods 59, which hold the rings in firm assembled relation. For convenience in handling the coils are provided with unions 60, and the coils can be separated at the unions into a left hand half and a right hand half. Fat is introduced into the coils through a manifold 63, which leads from the outside of the column 30 (Figures 7 and 8). The coils are supported inside the column by the manifold 63 and by a series of brackets 64 which are attached to the sides of the column 30.

Glycerine water is removed from the bottom of the tower through the line 32, which line has an open end in the upper portion of the cup 41, as illustrated most clearly in Figure 4. The cup 41 serves as a dirt catcher for any dirt which may be too heavy to collect at the interface 38 between glycerine water and fat. Dirt collects below the open end of the line 32. The lower part of the cup 41 is formed by a plate 66, which is bolted to the lower part of the tower 30 by heavy bolts 67. A plug 68 is provided in the center of the plate 66 through which dirt, collected in the cup 41, may be removed.

Figure 9:
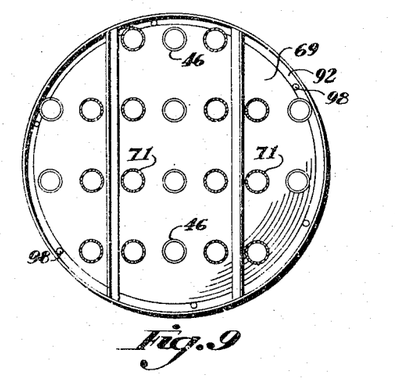
Figure 9 is a sectional view showing the uppermost plate shown in Figure 5, the section being taken along the line 9—9.
Figure 10:
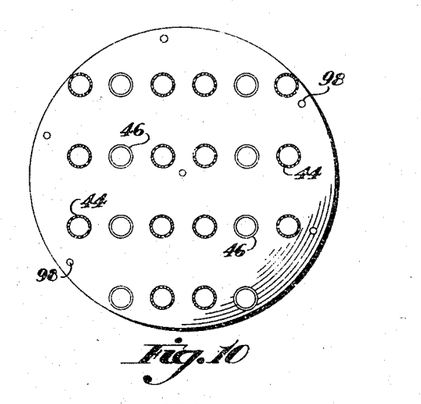
Figure 10 is a sectional view showing the plate immediately below that illustrated in Figure 9, the section being taken along the line 10—10 in Figure 5.
Figure 11:
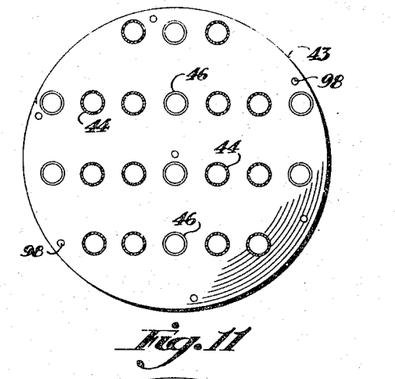
Figure 11 is a sectional view showing the plate immediately below that illustrated in Figure 10, the section being taken along the line 11—11 in Figure 5.

The construction of the baffled upper heat exchange zone is shown in detail in Figure 5. A series of horizontal baffle plates 43 is shown. Details are shown for only a small number of plates at the upper and lower ends of the upper heat exchange zone because the intermediate plates have the same construction as do the upper plates, as will be explained more clearly below. The number of baffle plates may vary with the amount of heat exchange to be effected and the design of the plates. The preferred design of the individual plates is shown in Figures 9 through 13 inclusive. The uppermost plate 69 is illustrated in Figure 9 and carries a number of tall chimneys 71 (Figure 5) which lead up from the upper heat exchange zone to a point above a water inlet coil 72. The plate 69 also contains a number of downspouts 46 which extend upwardly only a short distance above the plate 69 and extend downwardly almost to the next lower plate 74. The next lower plate 74 has the construction shown in Figure 10 and contains a number of chimneys 44 and downspouts 46. The chimneys 44 on the plate 74, however, are not so high as those on the plate 69, extending almost to the lower surface of the plate 69; the chimneys and downspouts on the plate 74 are spaced horizontally from those on the plate above and those on the plate below. Next below the plate 74 is a plate 78 which has the design shown in Figure 11. The chimneys and downspouts on the plate 78 are of the same dimensions as those on the plate 74 but are again in spaced horizontal relationship to the chimneys and downspouts on plate 74. Below the plate 78 is a series of plates having alternately the constructions shown in Figures 10 and 11.

Figure 14:
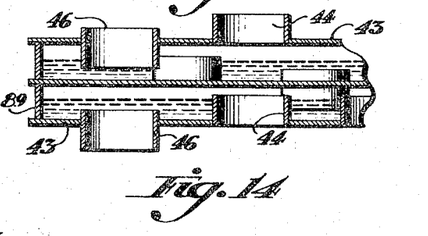
Figure 14 is an enlarged sectional view showing details of the plates illustrated in Figure 5.

In Figure 14, a portion of three plates is shown in a large scale to show the liquid levels on the plates. The water level on each plate is shown shaded while the fatty acid level is left unshaded. The downspouts 46, as already described, extend from a little above each plate down into the water level on the next lower plate, and the chimneys 44 extend from each plate up into the fat level above the plate. Thus, the water on one plate flows downward through the downspouts into the water level on the next lower plate, and the fatty acid flows upward through the chimneys into the fatty acid level on the next higher plate. At no place in the upper heat exchange zone do the fatty acid and water commingle, but continuous phase layers of water and fatty acid are exposed to each other to effect heat exchange, and water and fatty acid are channelled as they flow past each other.

Figure 12:
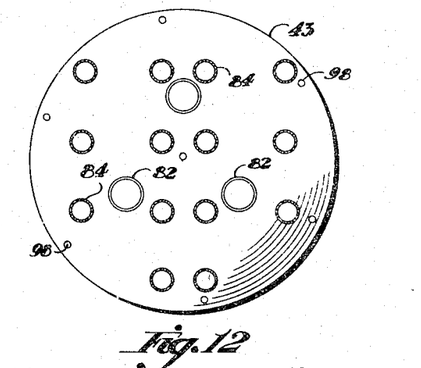
Figure 12 is a sectional view showing the lowermost plate used in the upper heat exchange zone, the section being taken along the line 12—12 in Figure 5.

The lowest plate in the baffled heat exchange structure is numbered 81 and has the design shown in Figure 12. This plate varies from the other plates in that it has three long downspouts 82 which extend nearly down to a perforated plate 83 instead of the greater number of downspouts used on other plates. In addition the plate 81 is spaced below the next higher plate a greater distance than divides the higher plates and has chimneys 84 which are higher than the chimneys on the other plates.

Figure 13:
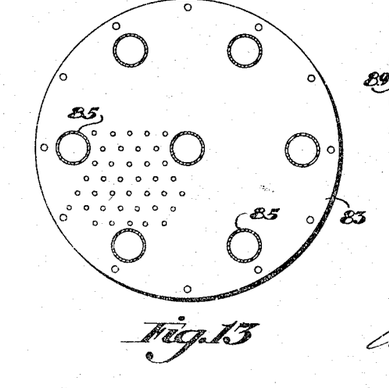
Figure 13 is a sectional view showing the perforated plate through which water is introduced into the central splitting zone, the section being taken along the line 13—13 in Figure 5.

The perforated plate 83 is located below the steam coil 37 and has the design shown in Figure 13 having a number of tall chimneys 85 through which split fatty acid rises into the upper heat exchange zone and a large number of perforations 86 through which water leaves the upper heat exchange zone and is dispersed to fall through the column of fat in the central splitting zone. A bracket 87 attached to the sides of the column 30 supports the steam coil 37 above the perforated plate.

The plates are mounted on a series of tie rods 88 (Figure 5). A series of annular spacers 89 having a diameter slightly less than the inner diameter of the tower 30 and a series of small annular spacers 90 mounted on the central tie rod 91 hold the plates in spaced relationship with one another. The uppermost plate 69 carries a flange 92 (Figures 6 and 9) to which the upper ends of the tie rods are attached as shown in Figure 6 by means of a washer 93 and a nut 94. The flange 92 is attached to the sides of the column 30 by bolts 95 as shown in Figure 5, and the sides of the column 30 are strengthened as at 97 to take the bolts 95. The tie rods pass through the plates through openings drilled in the plates as shown at 98 in Figures 9 through 13 inclusive and the lower ends of the tie rods are attached to the lowermost plate 81 by nuts 99 as shown in Figure 5. Certain of the tie rods are equipped with eye-shaped heads 101, and the entire baffle assembly can be lifted from the tower by tackle attached to the heads 101.

The perforated plate 83 is attached to the sides of the column 30 by means of a flange 102 attached to the sides of the column, and the perforated plate is separate from the baffled structure.

Two alternate devices for closing the top of the column are shown. On the right hand side of Figure 5 is shown a domed head 104 which is attached to the body of the column by bolts 105. On the left hand side of the Figure 5 is shown a flat plate cover 106 which can be used in place of the domed head 104. One of a series of bolts 107 is shown for holding the plate cover 106 in place.

A short distance below the top of the column 30 is located the fatty acid catching funnel 34 into which fatty acids overflow and from which the acids are removed through the line 35. The funnel 34 is supported by a bracket 108 attached to the sides of the column 30 by bolts 109. The bracket 108 also supports the water introducing coil 72, through which feed water is introduced into the column. A line 112 leads water into the coil 72.

Figure 15:
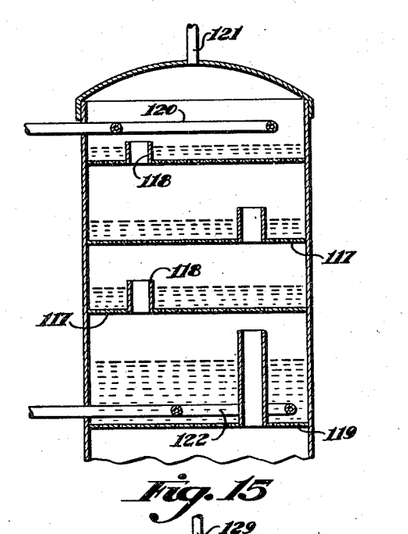
Figure 15 is a schematic sectional side elevational view of the upper portion of a tower having perforated plates instead of the baffles shown in Figure 2.
Figure 16:
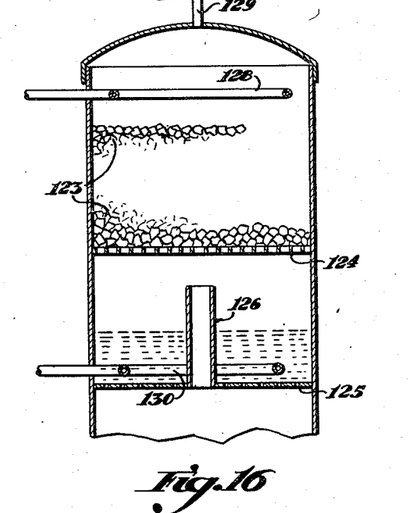
Figure 16 is a diagrammatic sectional side elevational view of the upper portion of a tower in which granular packing is used in place of the baffles shown in Figure 2.
Figure 17:
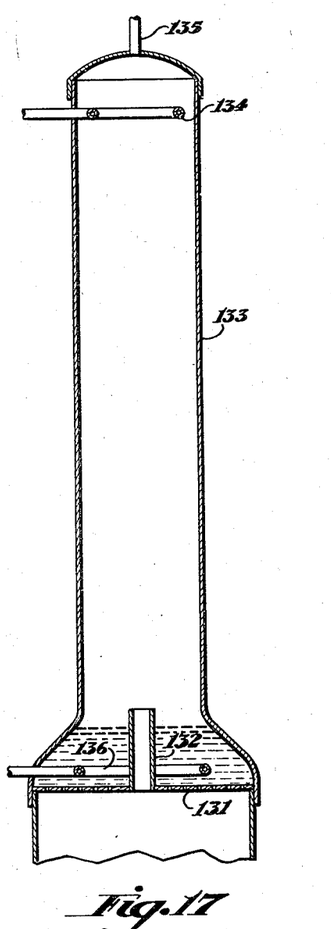
Figure 17 is a diagrammatic sectional side elevational view of the upper portion of a tower in which a long narrow vertical column takes the place of the baffled upper structure shown in Figure 2.

In Figures 15, 16, and 17 are shown schematically alternate devices for effecting heat exchange in the upper portion of the tower. In Figure 15 a series of perforated plates 117, each of which carries a chimney 118, are used to channel water and fatty acids through an upper heat exchange zone. An additional perforated plate 119 at the bottom of the heat exchange zone is used to distribute water as it leaves the upper heating zone and enters the central splitting zone of the column. Water is introduced through a coil 120 above the uppermost perforated plate and split fatty acids are removed from the top of the column through line 121 and steam is introduced into the column at the bottom of the heat exchange zone through a coil 122.

In Figure 16 a packing in the upper part of the column takes the place of the baffle structure of Figure 2. A granular packing 123 rests on a perforated plate 124. Below the perforated plate 124 and spaced from it is a perforated distributor plate 125 having a chimney 126. The plate 125 operates in the same maner as the distributor plates already described. Water is introduced at the top of a column through a coil 128, fatty acids are removed from the top of the tower through a line 129 and steam is introduced through a coil 130 in the manner described for the other views.

In Figure 17 a tall narrow column takes the place of the series of baffles shown in Figure 2. A perforated plate 131 having a chimney 132 acts in the same manner as the perforated distributor plates already described. Above the distributor plate 131 is a tall column of restricted diameter 133 through which water and acid flow past one another in unobstructed countercurrent flow. Water is introduced through a coil 134, fatty acids removed through a line 135, and steam introduced through a coil 136 in the manner described for Figures 14 and 15.

The operation of the preferred embodiment of this invention will now be described in detail with reference to Figure 2, which illustrates the preferred embodiment diagrammatically. When the tower is in steady operation, it is completely full of liquid reactants under pressure at all times. The lower part of the tower 30 contains a continuous phase of glycerine water having an upper level or interface 38. Fat is constantly introduced through the coil 33 into the glycerine water. At the temperature the fat is introduced, it has a higher specific gravity than the glycerine water at the interface 38. However, the fat gradually picks up heat from the glycerine water and becomes lighter as it does so and rises continuously through the glycerine water to the interface 38. Meanwhile, the falling glycerine water is commingled with the rising fat, gives up heat to the fat, and is constantly removed through the line 32.

The central portion of the tower between the steam coil 36 and the steam coil 37 is maintained at a splitting temperature, and droplets of water constantly fall through a rising continuous column of fat in the splitting zone. Split fatty acids leave the central splitting zone through the chimneys 84 associated with the perforated plate 83. The temperature of the splitting zone is maintained by introducing steam through the coils 36 and 37.

A continuous phase of water is maintained above the perforated plate 83 and fatty acids from the chimneys 84 collect on top of the layer of water maintained above the perforated plate 83. In the upper heat exchange zone fatty acids flow upwardly through the upper heat exchange zone in countercurrent flow to descending water. Such fatty acids and water maintain continuous phases above each plate; and there are two liquid levels above each plate, a layer of fat and a layer of water below the level of fat. The chimneys 44 connect the layers of fat with the layers on plates above while the downspouts 46 connect the layers of water with water layers on the plates below. When the tower is in continuous operation, the chimneys are at all times filled with rising fat. The water on the other hand overflows from the plates into the downspouts, and is led by the downspouts into the water levels on lower plates and there may be fat present in the downspouts as well as falling water. Above the uppermost baffle, water is introduced and split fatty acids are removed from the tower.

Dirt and foreign matter introduced with the fat stock tend to collect in the bottom of the tower and in the fat layer, at the interface 38 between the glycerine water and fat. The removal of dirt from the bottom of the tower has already been described. Dirt which collects at the interface 38 may be removed from the tower by opening one or more of the pet cocks 39.

A tower suitable for commercial operation may have a height of substantially 50 to 70 feet and a diameter of substantially 18 to 36 inches, the proportions being a matter of engineering choice in relation to the operation intended. In order to avoid radiation losses the exterior of the tower is protected by insulation and, if desired, electrical or other heating elements may be incorporated in the insulation.

The term, fat, as used herein is intended to comprehend, generally, the fatty glycerides of commerce regardless of their melting points, including vegetable and marine oils as well as animal fats, garbage grease, foots of various types, and hydrogenated glycerides. The water used in the process may be distilled water, or tap water in its natural state or conditioned, depending upon the later treatment and intended use of the fatty acids produced. The process may be used with or without conventional fat splitting catalysts including the zinc calcium and magnesium oxides and soaps. The process and the tower have been described without recitations of conditions or structure requiring, or peculiarly suitable to, the use of a catalyst.

The input temperature of the fat should not substantially exceed 100° centigrade and may be any temperature selected between that at which the fat is sufficiently liquid to pump and a temperature approximating that of the outgoing glycerine water. The temperature of 80° centigrade is appropriate, for instance, for the treatment of a fat having the consistency of tallow.

The temperature of the input water should not substantially exceed 100° centigrade, but may be any temperature between that of tap water and a temperature approximating that of the outgoing fatty acids. For instance, a temperature of 40° centigrade is convenient if the water evaporated from the glycerine water is re-utilized in the process.

The temperature of the outgoing glycerine water depends upon that of the input fat and the completeness of the heat transfer. The heat not removed from the glycerine water is wasted, to the extent that it cannot be utilized in the evaporation of the water from the glycerine. For most operations it is recommended that the glycerine water be withdrawn from the tower at a temperature somewhere in between 100 and 150° centigrade, 110° for example.

Likewise. it is recommended that the fatty acids be cooled by the input water, or the input water be heated by the fatty acids, to reduce the temperature of the fatty acids to substantially 100 to 160° centigrade. For example, the fatty acids may be removed from the tower at a temperature of 110° centigrade.

Since hydrolysis occurs at an accelerated rate at a temperature generally above 185° centigrade and the split proceeds more rapidly as the temperature is elevated, it is recommended that a maximum temperature of 240 to 260° centigrade be employed in the central portion of the column. Since the heat exchange zones add to the overall length of the column and hence the cost of its construction, it is recommended that they be utilized to salvage at least the amount of heat represented by a 100° centigrade drop in the temperature of the materials withdrawn from the column, and preferably a 150° drop which is readily feasible as a practical matter. Obviously, either the lower or the upper heat exchange zone can be used alone to conserve part of the heat if the operation following splitting utilizes either of the output products of the hydrolysis at elevated temperature. Also. the output of the tower may be cooled at either end below 100° centigrade if the value of the lower temperature compensates for the adjustments of the process necessary to procure it.

In a typical operation the fat is introduced at the bottom of the tower at a temperature of substantially 80° centigrade. The water is fed into the top of the tower preferably from the glycerine recovery system at a temperature of substantially 40° centigrade. The temperature in the central part of the tower is maintained at substantially 260° centigrade by the introduction of steam through the spargers at the ends of the zone of maximum split. The glycerine water and the fatty acids are each withdrawn at a temperature of substantially 110° centigrade. The steam introduced through the spargers is at a temperature of substantially 270° centigrade and under a pressure which is 50 to 100 lbs. above that necessary to maintain the liquid condition of the water in the column.

While it is recommended that the fat and water be introduced in the ratio generally inverse to their respective specific heats, the relative quantity of each fed to the tower may be adjusted in relation to the desired pumping temperatures, output temperatures, and the desired concentration of the glycerine water.

By the method and process of this invention the fat and water entering into the hydrolysis need not be pre-heated by high temperature heat before being introduced into the splitting tower and the high temperature heat used in the tower may be conserved by the heat exchange occurring within the confines of the integral column. Obviously, the direct contact heat exchange of this invention may be obtained in separate pressure vessels connected to the splitting column, but such impairment of structural integrality is not recommended for the usual contemporary commercial fat splitting operations.

In summary, this invention, from the point of view of method, comprehends the use of a high temperature, high pressure, countercurrent flow splitting zone, preferably characterized by the percolation of droplets of water, falling by gravity, downwardly through a continuous phase of rising fatty material. Heat exchange zones are utilized at either or each end of the splitting zone to salvage the high temperature heat utilized in the splitting zone. The length of each heat exchange zone is selected and determined to accomplish a conservation of heat appropriate and practically feasible in relation to convenient input feed temperatures and propitious output temperatures. The upper heat exchange zone is preferably characterized by the channeling or channelizing of the cooling fatty acids to avoid major convection currents otherwise incidental to the specific gravity drop of the fatty acids being chilled. The lower heat exchange zone is preferably characterized by the commingling of the input fat and the glycerine water resulting from the hydrolysis, one in a continuous phase, the other in a dispersed phase, whereby the travel of the dispersed phase in relation to the continuous phase is a function of the specific gravity differential between them at any given level and the dispersed phase approaches the interface between the pool of glycerine water in the bottom of the tower and the continuous ascending fat phase above it at a rate determined by the modification of the relative specific gravities of the phases by heat transfer between them.

The high temperature heat requisite for the maximum desired rate of split is preferably supplied to the process primarily by the medium of open steam at a temperature slightly above that of the fat and water in the splitting zone. This steam is preferably applied intermediate the long central splitting zone and either or each functionally contiguous heat exchange zone. The lower sparger may be at, above or slightly below the interface between the ascending continuous fat phase and the glycerine water below it but is preferably disposed in the fat phase slightly above the interface, the fat being introduced as a dispersed phase below the interface. The upper sparger is preferably located in a pool of water collected above a distributor plate between the zone of maximum split and the upper heat transfer zone.

From the point of view of apparatus the invention comprehends a utilization of the combinations of elements requisite to the conduct of the process, as disclosed and summarized, within the confines of a single, integral high pressure splitting tower.

Having described my invention, I claim:

1. The method of hydrolyzing fat with water countercurrently in a high pressure splitting tower, said method comprising introducing the water at a temperature not substantially exceeding 100° centigrade at a point adjacent to the top of the tower, introducing the fat at a temperature not substantially exceeding 100° centigrade at a point adjacent to the bottom of the tower, the ratio of the water to fat being substantially 6 to 10, withdrawing relatively cool fatty acid from the top of the tower, withdrawing relatively cool glycerine water from the bottom of the tower, effecting a direct heat interchange between the incoming water and the outgoing fatty acid adjacent to the top of and within the tower, effecting a heat interchange between the relatively cool fat and relatively hot glycerine water adjacent to the bottom of and within the tower, and applying heat to the contents of the tower intermediate of the heat exchange zones to maintain a splitting temperature of above 180° centigrade 2. The method of hydrolyzing a fat which comprises establishing a flow of input fat and input water which is countercurrent by reason of the difference in the specific gravities of the fat and the water, the temperatures of the input fat and input water not substantially exceeding 100° centigrade, exposing the fat and water during their countercurrent passage to a temperature in excess of 180° centigrade while maintaining a pressure sufficiently high to prevent vaporization of the water, whereby the fat is hydrolyzed, and while maintaining the flow of materials countercurrently, commingling the incoming cold fat with the hot water and glycerine which has been liberated by the hydrolysis of the fat, and exposing the hot liberated fatty acid to the incoming cool water.

3. The method of hydrolyzing a fat which comprises establishing a flow of input fat and input water which is countercurrent by reason of the difference in the specific gravities of the fat and the water, the temperatures of the input fat and input water not substantially exceeding 100° centigrade, heating the fat and water by injection of steam during their countercurrent passage to a temperature in excess of 180° centigrade while maintaining a pressure sufficiently high to prevent vaporization of the water whereby the fat is hydrolyzed and while maintaining the flow of materials countercurrently, commingling the incoming cold fat with the hot water and glycerine which is liberated upon hydrolysis of the fat and exposing the hot liberated fatty acid to the incoming water.

4. In the continuous high pressure countercurrent splitting of fat in a splitting tower, the method of heating the fat to a splitting temperature within the tower, said method comprising, introducing the fat adjacent to the bottom of the tower at a point spaced therefrom at a temperature which does not substantially exceed 100° centigrade, percolating water downwardly through the tower at a temperature of substantially 240° to 260° centigrade, withdrawing the water and the glycerine dissolved in it from the bottom of the tower at a level below that at which the fat enters, and commingling the glycerine water and the fat above the fat inlet whereby heat is exchanged between the glycerine water and the fat and they separate by virtue of and at a rate determined by the differences of their respective specific gravities at each elevation.

5. In the continuous high pressure countercurrent splitting of fat in a splitting tower, the method of heating fat to a splitting temperature which comprises introducing relatively cool fat near the bottom of the tower, percolating relatively hot water downwardly through the tower, and withdrawing relatively cool glycerine water at the bottom of the tower, the specific gravity of the descending water being less than the specific gravity of the fat entering the tower, whereby the fat and glycerine water commingle and separate by virtue of and at a rate determined by the differences of their respective specific gravities at each elevation, as progressively modified by the heat exchange.

6. In the method of hydrolyzing fat in a splitting tower by the countercurrent flow of fat and water, the step of heating the water to optimum splitting temperature which comprises, removing cooled split fatty acid from the top of the tower, introducing the water into the tower at a point spaced below the fatty acid outlet, channeling the fatty acid in the upper portion of the tower and simultaneously contacting it with cool water entering the tower sufficiently to cool the fatty acid to a temperature which is below 175° centigrade and heating the water to maximum operating temperature by means of direct steam at a level below that at which the water removes the heat from the fatty acids.

7. In the method of hydrolyzing fat by countercurrent flow in a vertical splitting tower, said method comprising, establishing an upwardly rising column of fatty material in continuous phase within the tower, percolating hot water through said fatty material to split it in the central portion of said tower, applying heat to the tower at points spaced from each end of the tower, cooling the glycerine water at the bottom of the tower by commingling it with incoming cool fat and cooling the fatty acid at the top of the tower by channeling it and exposing it to a downwardly channeled flow of cool water.

8. In the continuous high pressure splitting of fat in a splitting tower, the method of heating fat to a splitting temperature which comprises introducing the fat at the bottom of the tower at below splitting temperature, percolating water downwardly through the tower, withdrawing glycerine water at the bottom, and applying heat to the contents of the tower at a point spaced from the bottom to constitute a heat exchange zone between the point of application of the heat and the bottom of the tower, said applied heat being adapted to elevate the temperature of the fat to such a point that the specific gravity of the glycerine water falling through it is less than the specific gravity of the fat entering the tower, whereby the fat and glycerine water in the heat exchange zone commingle and separate by virtue of and at a rate determined by the differences of their specific gravities at each elevation, as progressively modified by the heat exchange.

9. The method of hydrolyzing fat with water countercurrently in a high pressure splitting tower, said method comprising introducing the water at a temperature not substantially exceeding 100° centigrade at a point adjacent to the top of the tower, introducing the fat at a temperature not substantially exceeding 100° centigrade at a point adjacent to the bottom of the tower, withdrawing relatively cool fatty acid from the top of the tower, withdrawing relatively cool glycerine water from the bottom of the tower, effecting a direct heat exchange between the incoming water and the outgoing fatty acid adjacent the top of and within the tower, effecting a heat exchange between the relatively cool fat and relatively hot glycerine water adjacent the bottom and within the tower, said fat and glycerine water flowing through each other without mechanical interruption, said fat having a greater specific gravity upon entering the bottom of the column than the glycerine water at splitting temperature, and applying heat to the contents of the tower intermediate of the heat exchange zones to maintain a splitting temperature of substantially 240° to 260° centigrade.

10. The method of hydrolyzing fat with water countercurrently in a high pressure splitting tower, said method comprising, introducing the water at a temperature not substantially exceeding 100° centigrade at a point adjacent to the top of the tower, introducing the fat at a temperature not substantially exceeding 100° centigrade at a point adjacent to the bottom of the tower, withdrawing relatively cool fatty acid from the top of the tower, withdrawing relatively cool glycerine water from the bottom of the tower, effecting a direct heat exchange between the incoming water and the outgoing fatty acid adjacent the top of and within the tower, effecting a heat exchange between the relatively cool fat and relatively hot glycerine water adjacent the bottom of and within the tower, said fat and glycerine water flowing through each other without mechanical interruption, and applying heat to the contents of the tower intermediate of the heat exchange zones to maintain a splitting temperature of above 180° centigrade.

11. In the method of hydrolyzing fat by countercurrent flow in a vertical splitting tower, said method comprising, establishing an upwardly rising column of fatty material in continuous phase within the tower, percolating water through said fatty material to split it in the central portion of said tower, applying heat to the tower at points spaced from each end of the tower, cooling the glycerine water by 100–150° centigrade at the bottom of the tower by commingling it with incoming cool fat and cooling the fatty acid by 100–150° centigrade at the top of the tower by channeling it and exposing it to a downwardly channeled flow of cool water.

12. A method of hydrolyzing fat with water countercurrently in a high pressure splitting tower, said method comprising introducing the water at a temperature of substantially 40° centigrade at a point adjacent to the top of the tower, introducing the fat at a temperature of substantially 80° centigrade at a point adjacent to the bottom of the tower, effecting a direct heat exchange between the incoming water and the fatty acid adjacent to the top of and within the tower, effecting a direct heat exchange between the input fat and the glycerine water adjacent to the bottom of and within the tower, applying heat to the contents of the tower intermediate the heat exchange zones to maintain a temperature of substantially 260° centigrade between them, and withdrawing fatty acid at the top of the tower and glycerine water at the bottom of the tower each substantially at a temperature of 110° centigrade.

13. The method of hydrolyzing fat with water countercurrently in a high pressure splitting tower, said method comprising introducing water at a point adjacent to the top of the tower, introducing the fat of substantially 80° centigrade at a point adjacent to the bottom of the tower, effecting a direct heat exchange between the input fat and the glycerine water adjacent to the bottom of and within the tower, applying heat to the contents of the tower to maintain a temperature of substantially 260° centigrade above the zone of heat exchange, withdrawing fatty acid at the top of the tower and withdrawing glycerine water at the bottom of the tower at a temperature of substantially 110° centigrade.

14. The method of hydrolyzing fat with water countercurrently in a high pressure splitting tower, said method comprising introducing the water at a temperature of substantially 40° centigrade at a point adjacent to the top of the tower, introducing the fat at a point adjacent to the bottom of the tower, effecting a direct heat exchange between the incoming water and the fatty acid adjacent to the top of and within the tower, applying heat to the contents of the tower below the upper zone of heat exchange to maintain a temperature of substantially 260° centigrade below, withdrawing glycerine water at the bottom of the tower, and withdrawing fatty acid at the top of the tower at a temperature of substantially 110° centigrade.

15. The method of hydrolyzing fat by countercurrent flow in a vertical high pressure splitting tower which comprises establishing an upwardly rising column of fatty material in continuous phase above a continuous phase of glycerine water within the tower, percolating hot water through said fatty material to split it in the central portion of said tower, applying heat to the tower at points spaced from each end of the tower, introducing incoming cool fat below an interface between said phases to commingle the glycerine water and fat and cool the glycerine water while heating the fat, and cooling the fatty acid at the top of the tower by channeling it and exposing it to a downwardly channeled flow of cool water.

16. The method of hydrolyzing fat with water countercurrently in a high pressure splitting tower said method comprising, introducing distilled water at the top of the tower, percolating the water downwardly through a rising column of fatty material within the tower at a temperature of 240 to 260° centigrade to split the fatty material, cooling the glycerine water adjacent to the bottom of the tower by introducing the fat to be split at a temperature below the specified splitting temperature, withdrawing the chilled glycerine water at the bottom of the tower at a temperature of 100 to 150° centigrade, distilling part of the water from said glycerine water and recycling the water so distilled as the input distilled water.

17. A splitting tower for the high pressure high temperature countercurrent flow hydrolysis of fatty materials, comprising a lower portion substantially free of flow-opposing structure, a series of baffles in the upper portion of the tower; a plate below said baffles, said plate having a plurality of perforations whereby water admitted to the upper portion of the tower is collected and distributed for unopposed gravity settling due to density differentials through liquid in said lower portion; a heater supplying direct steam to the contents of the tower, said heater spaced below said series of baffles; and a second heater supplying direct steam to the contents of the tower, said heater spaced above the bottom of the tower but below said first heater, that portion of the tower between said heaters constituting a substantial proportion of the entire tower.

18. A splitting tower adapted for the high temperature high pressure countercurrent flow hydrolysis of fatty material, comprising a lower portion substantially free of flow-opposing structure, a series of substantially horizontal barriers in the upper portion of said tower, each of said barriers having a plurality of substantially vertical chimneys for the upward passage of fatty acid, said chimneys disposed upwardly from the levels of their respective barriers, each of said barriers having a plurality of substantially vertical conduits for the downward passage of aqueous solution, the tops of the conduits of each barrier being respectively disposed below the tops of the chimneys of said barriers and the tops of the chimneys in turn disposed below the bottoms of the conduits of the respective next uppermost barriers; a perforated plate for distributing aqueous solution for unopposed gravity settling due to density differentials through liquid in said lower portion, said plate having at least one substantially vertical chimney for the upward passage of fatty material, and a heater disposed above said plate for elevating the temperature of the water.

19. A splitting tower for the continuous high pressure high temperature countercurrent flow hydrolysis of fatty material, comprising a substantially vertically disposed elongated vessel adapted to contain the materials at the elevated temperature and pressure, a lower portion substantially free of flow-opposing structure, a plurality of substantially horizontal barriers in the upper portion of said tower, a perforated plate for distributing aqueous solution for unopposed gravity settling due to density differentials through liquid in said lower portion, said plate disposed below the lowest of said barriers, a heater supplying direct steam for elevating the temperature of aqueous solution, said heater disposed just above said plate, a second heater supplying direct steam within said tower disposed below said plate, that portion of the tower between said heaters constituting substantially 80 to 90% of the total volume of said tower, a perforated coil below said second heater for introducing fatty material in dispersed state, an inlet and outlet for water and fatty acids respectively, said inlet and outlet disposed near the top of the tower above the topmost of said barriers, and an outlet for aqueous solution near the bottom of the tower.

ALEXANDER C. BROWN.

REFERENCES CITED

The following references are of record in the file of this patent:

UNITED STATES PATENTS

| Number | Name | Date |
| --- | --- | --- |
| 2,191,919 | Thayer | Feb. 27, 1940 |
| 2,213,798 | Anne | Sept. 3, 1940 |
| 2,215,359 | Livingston | Sept. 17, 1940 |
| 2,221,799 | Ittner | Nov. 19, 1940 |
| 2,458,170 | Ittner | Jan. 4, 1949 |